US012585880B2

(12) United States Patent
Zhang et al.

(10) Patent No.: US 12,585,880 B2
(45) Date of Patent: Mar. 24, 2026

(54) SCALABLE CONSISTENCY ENSEMBLE FOR MACHINE LEARNING MODELS

(71) Applicant: Intuit, Inc., Mountain View, CA (US)

(72) Inventors: Jiaxin Zhang, Mountain View, CA (US); Kamalika Das, Saratoga, CA (US); Sricharan Kallur Palli Kumar, Milpitas, CA (US)

(73) Assignee: Intuit Inc., Mountain View, CA (US)

( * ) Notice: Subject to any disclaimer, the term of this patent is extended or adjusted under 35 U.S.C. 154(b) by 161 days.

(21) Appl. No.: 18/429,109

(22) Filed: Jan. 31, 2024

(65) Prior Publication Data

US 2025/0245437 A1 Jul. 31, 2025

(51) Int. Cl.
G06F 40/30 (2020.01)
G06F 40/20 (2020.01)

(52) U.S. Cl.
CPC .............. G06F 40/30 (2020.01); G06F 40/20 (2020.01)

(58) Field of Classification Search
CPC .................................. G06F 40/20; G06F 40/30
See application file for complete search history.

(56) References Cited

U.S. PATENT DOCUMENTS

| | | | | |
|---|---|---|---|---|
| 11,423,334 B2 * | 8/2022 | Venkateswaran | ...... | G06N 5/045 |
| 12,008,332 B1 * | 6/2024 | Gardner | ................ | G06F 16/345 |
| 12,346,828 B2 * | 7/2025 | Wei | ........................ | G06N 5/022 |
| 2020/0311751 A1 * | 10/2020 | Shi | ...................... | G06Q 30/0203 |
| 2022/0309096 A1 * | 9/2022 | Patil | ...................... | G06F 16/685 |
| 2023/0039248 A1 * | 2/2023 | McCartney | ......... | G10L 21/0356 |
| 2023/0161972 A1 * | 5/2023 | Härmä | .................... | G06F 40/56 |
| | | | | 704/9 |
| 2023/0325725 A1 * | 10/2023 | Lester | ................ | G06V 10/7747 |
| 2024/0296294 A1 * | 9/2024 | Imani | .................. | G06F 16/3329 |
| 2024/0386015 A1 * | 11/2024 | Crabtree | ............. | G06F 16/9024 |
| 2025/0111220 A1 * | 4/2025 | Jones | ...................... | G06N 3/08 |
| 2025/0156654 A1 * | 5/2025 | Petrauskas | .............. | G06F 40/40 |

* cited by examiner

*Primary Examiner* — Eric Yen
(74) *Attorney, Agent, or Firm* — Dinsmore & Shohl LLP

(57) ABSTRACT

Certain aspects of the disclosure provide a method for generating a final output response. The method may include receiving an input; generating a plurality of intermediate responses to the input using a plurality of machine learning models, wherein each machine learning model of the plurality of machine learning models generates at least one intermediate response based on the input; generating a semantic consistency metric for each respective intermediate response of the plurality of intermediate responses by performing a comparison between the respective intermediate response and other intermediate responses of the plurality of intermediate responses; selecting a subset of the plurality of intermediate responses based on the semantic consistency metric of each respective intermediate response of the plurality of intermediate responses; and generating a final output response based on the subset of the plurality of intermediate responses.

20 Claims, 9 Drawing Sheets

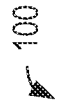
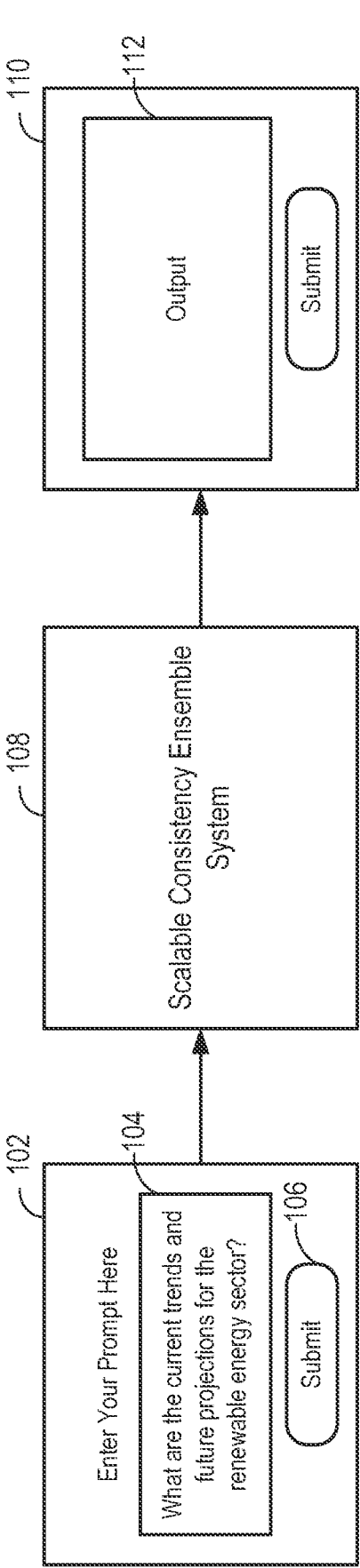
100
102
Enter Your Prompt Here
104
What are the current trends and
future projections for the
renewable energy sector?
106
Submit
108
Scalable Consistency Ensemble
System
110
112
Output
Submit
*FIG. 1*

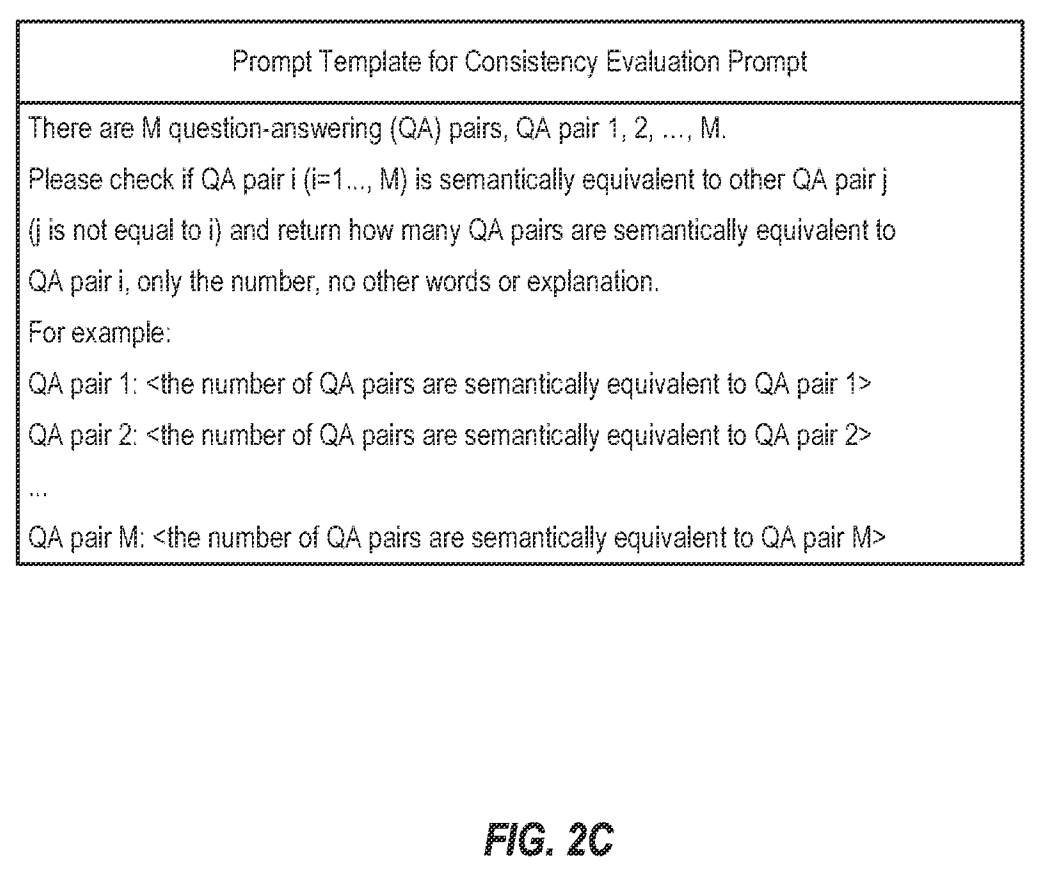

Prompt Template for Consistency Evaluation Prompt

There are M question-answering (QA) pairs, QA pair 1, 2, ..., M.

Please check if QA pair i (i=1..., M) is semantically equivalent to other QA pair j (j is not equal to i) and return how many QA pairs are semantically equivalent to QA pair i, only the number, no other words or explanation.

For example:

QA pair 1: <the number of QA pairs are semantically equivalent to QA pair 1>

QA pair 2: <the number of QA pairs are semantically equivalent to QA pair 2>

...

QA pair M: <the number of QA pairs are semantically equivalent to QA pair M>

*FIG. 2C*

Figure 2D:
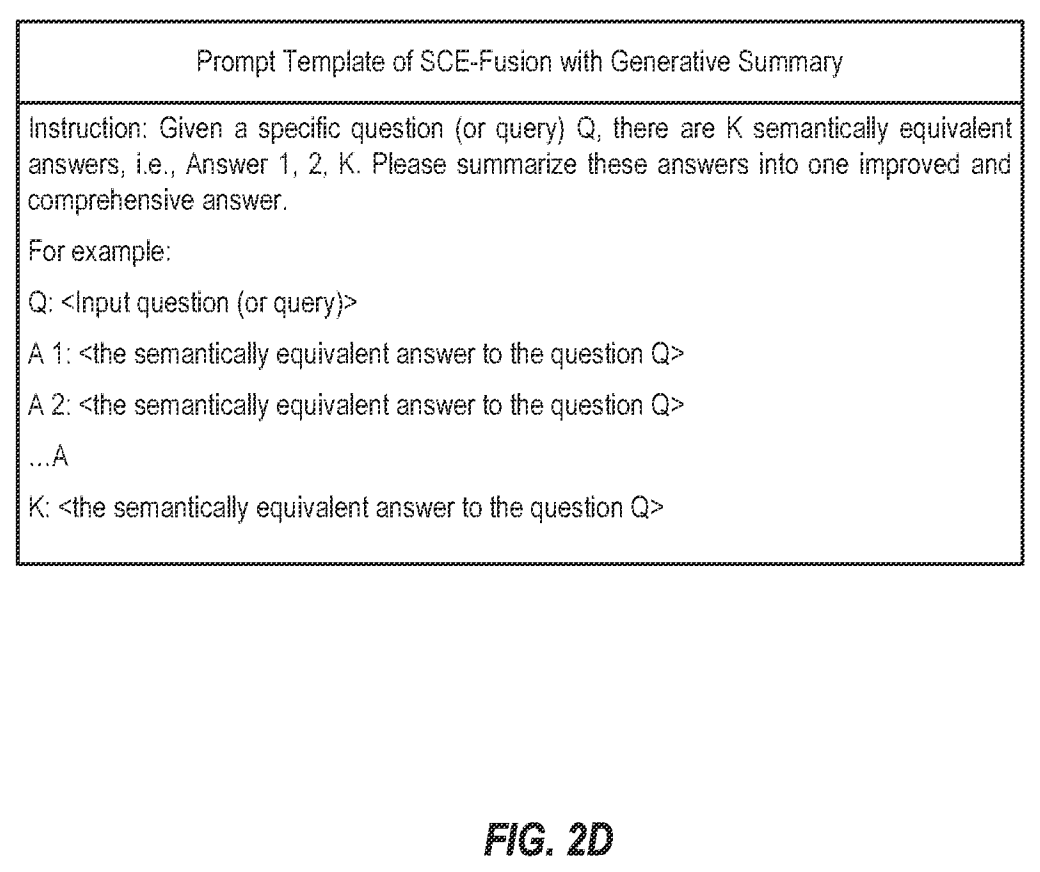

Prompt Template of SCE-Fusion with Generative Summary

Instruction: Given a specific question (or query) Q, there are K semantically equivalent answers, i.e., Answer 1, 2, K. Please summarize these answers into one improved and comprehensive answer.

For example:

Q: <Input question (or query)>

A 1: <the semantically equivalent answer to the question Q>

A 2: <the semantically equivalent answer to the question Q>

...A

K: <the semantically equivalent answer to the question Q>

Figure 3:
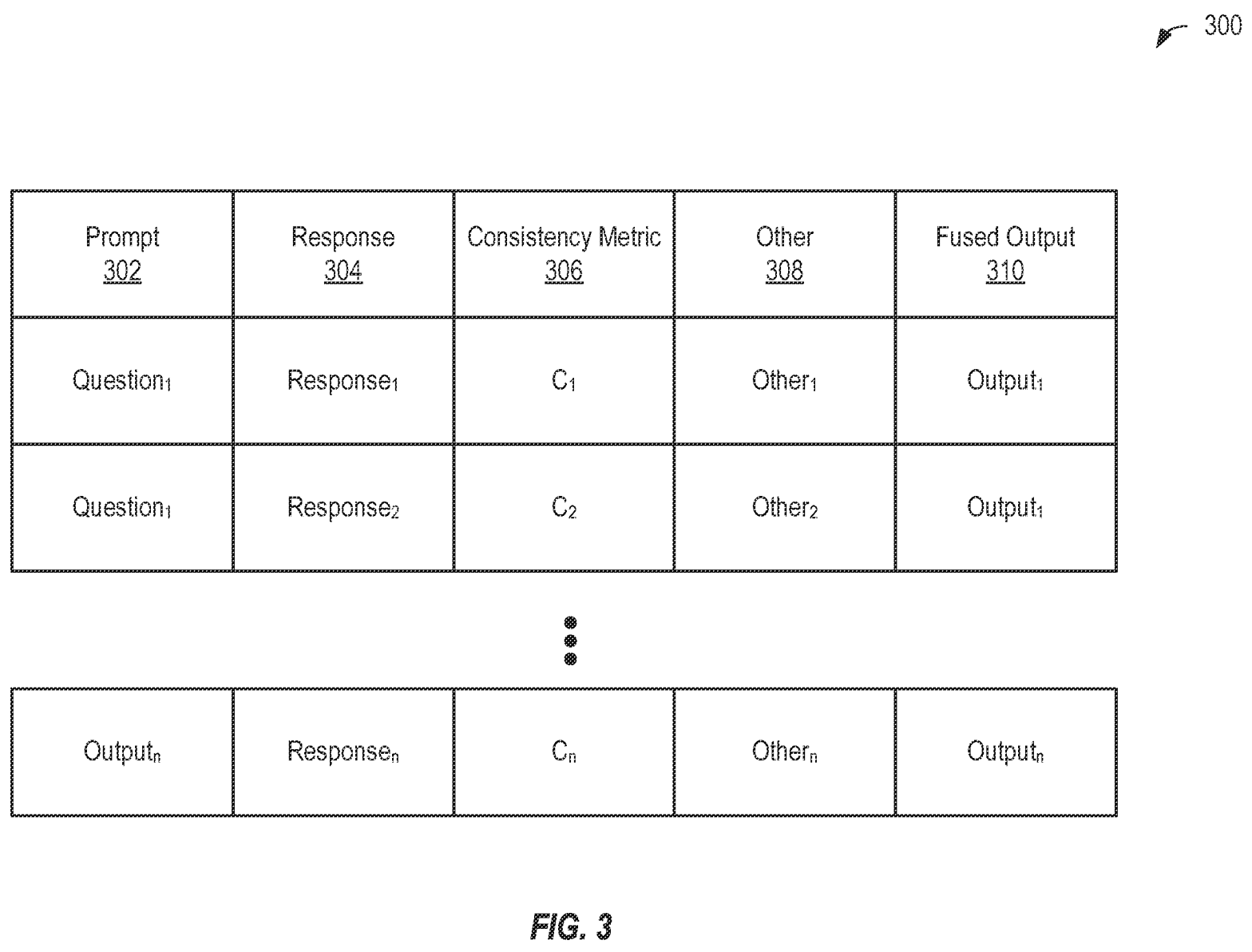

| Prompt 302 | Response 304 | Consistency Metric 306 | Other 308 | Fused Output 310 |
|---|---|---|---|---|
| Question$_1$ | Response$_1$ | C$_1$ | Other$_1$ | Output$_1$ |
| Question$_1$ | Response$_2$ | C$_2$ | Other$_2$ | Output$_1$ |

• • •

| Output$_n$ | Response$_n$ | C$_n$ | Other$_n$ | Output$_n$ |
|---|---|---|---|---|

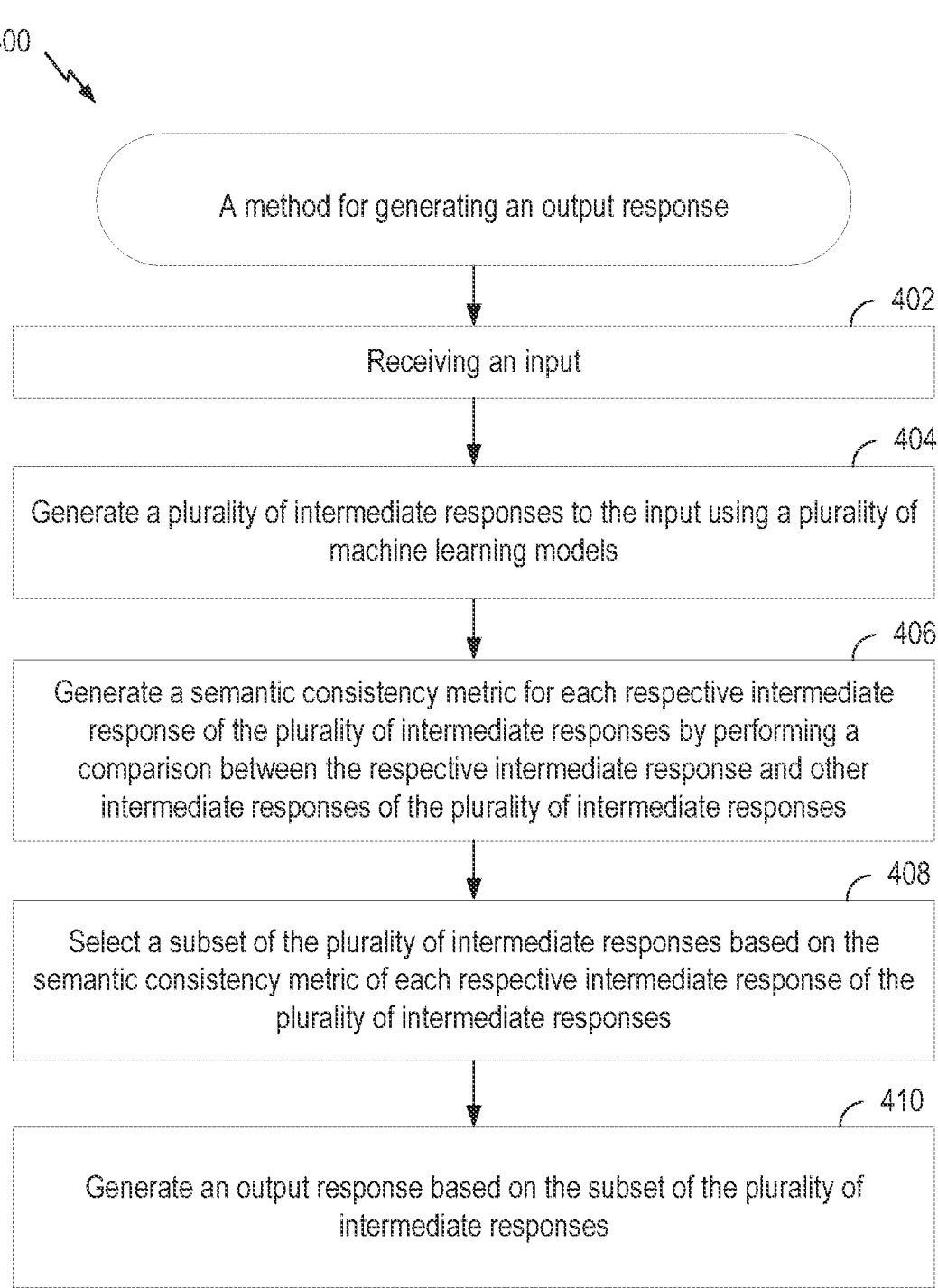

A method for generating an output response

402

Receiving an input

404

Generate a plurality of intermediate responses to the input using a plurality of machine learning models

406

Generate a semantic consistency metric for each respective intermediate response of the plurality of intermediate responses by performing a comparison between the respective intermediate response and other intermediate responses of the plurality of intermediate responses

408

Select a subset of the plurality of intermediate responses based on the semantic consistency metric of each respective intermediate response of the plurality of intermediate responses

410

Generate an output response based on the subset of the plurality of intermediate responses

FIG. 4

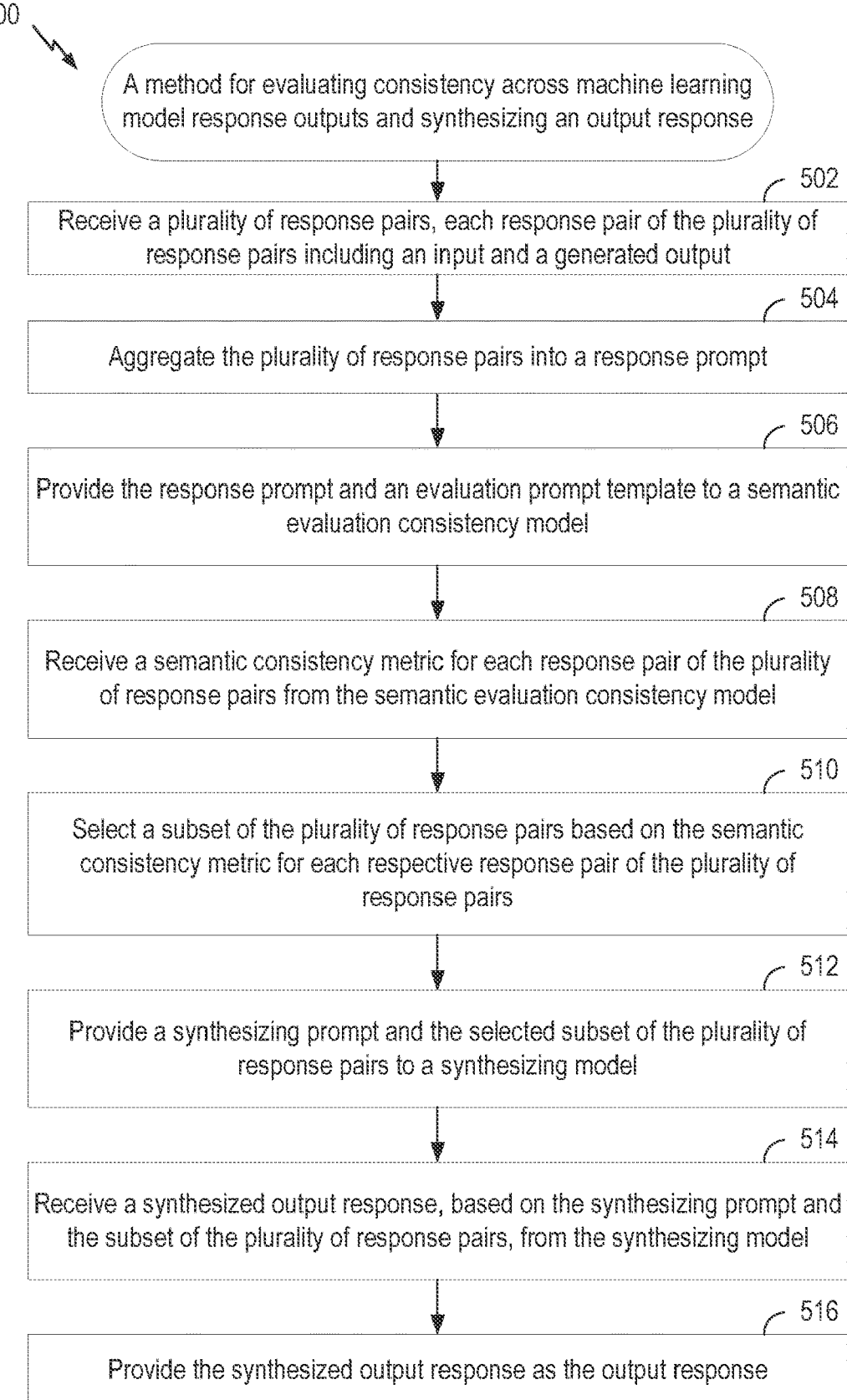

500

A method for evaluating consistency across machine learning model response outputs and synthesizing an output response 502
Receive a plurality of response pairs, each response pair of the plurality of response pairs including an input and a generated output 504
Aggregate the plurality of response pairs into a response prompt 506
Provide the response prompt and an evaluation prompt template to a semantic evaluation consistency model 508
Receive a semantic consistency metric for each response pair of the plurality of response pairs from the semantic evaluation consistency model 510
Select a subset of the plurality of response pairs based on the semantic consistency metric for each respective response pair of the plurality of response pairs 512
Provide a synthesizing prompt and the selected subset of the plurality of response pairs to a synthesizing model 514
Receive a synthesized output response, based on the synthesizing prompt and the subset of the plurality of response pairs, from the synthesizing model 516
Provide the synthesized output response as the output response

FIG. 5

SCALABLE CONSISTENCY ENSEMBLE FOR MACHINE LEARNING MODELS

BACKGROUND

Field

Aspects of the present disclosure relate to language processing and, more specifically, to enhancing the reliability and consistency of responses generated by machine learning models.

Description of Related Art

The advancement in the field of artificial intelligence has led to the development of machine learning models capable of understanding and generating human-like text. However, the effectiveness of these models is often hampered by inconsistencies and variability in their responses, especially when handling complex or nuanced queries. Traditional natural language processing (NLP) systems typically rely on single-model approaches, which are constrained by the inherent limitations of the individual models. These systems suffer from a lack of reliability and an inability to adapt to varied user needs and contexts, leading to suboptimal responses.

Moreover, existing natural language processing frameworks provide a one-size-fits-all approach that does not accommodate the specific requirements of different users or scenarios. The reliance on hardcoded algorithms and pre-defined logic further limits the adaptability and precision of these systems. Consequently, there is a growing need for a more robust and flexible approach that can harness the collective capabilities of various machine learning models to generate responses that are more accurate, contextually relevant, and reliable.

SUMMARY

Certain aspects provide a method for generating an output response. In examples, the method may include receiving an input and generating a plurality of intermediate responses to the input using a plurality of machine learning models, wherein each machine learning model of the plurality of machine learning models generates at least one intermediate response based on the input. The method may further include generating a semantic consistency metric for each respective intermediate response of the plurality of intermediate responses by performing a comparison between the respective intermediate response and other intermediate responses of the plurality of intermediate responses; selecting a subset of the plurality of intermediate responses based on the semantic consistency metric of each respective intermediate response of the plurality of intermediate responses; and generating a final output response based on the subset of the plurality of intermediate responses.

Certain aspects provide a method for evaluating consistency across machine learning model response outputs and synthesizing an output response. The method may include receiving a plurality of response pairs, each response pair of the plurality of response pairs including an input and a generated output; aggregating the plurality of response pairs into a response prompt; and providing the response prompt and an evaluation prompt template to a semantic evaluation consistency model. In examples, the method may include receiving a semantic consistency metric for each response pair of the plurality of response pairs from the semantic evaluation consistency model; selecting a subset of the plurality of response pairs based on the semantic consistency metric for each respective response pair of the plurality of response pairs; and providing a synthesizing prompt and the selected subset of the plurality of response pairs to a synthesizing model. In some examples, the method may include receiving a synthesized output response, based on the synthesizing prompt and the subset of the plurality of response pairs, from the synthesizing model, and providing the synthesized output response as the final output response.

Other aspects provide processing systems configured to perform the aforementioned methods as well as those described herein; non-transitory, computer-readable media comprising instructions that, when executed by a processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

DESCRIPTION OF THE DRAWINGS

The appended figures depict certain aspects and are therefore not to be considered limiting of the scope of this disclosure.

FIG. 1 depicts a system that facilitates response generation by leveraging collective capabilities of machine learning models.

FIGS. 2A-2D depict additional details of a scalable consistency ensemble (SCE) system in accordance with examples of the present disclosure.

FIG. 3 depicts an overview of an example data structure 300 for leveraging multiple machine learning models in accordance with examples of the present disclosure.

FIG. 4 depicts an example method for generating an output response.

FIG. 5 depicts another example method for generating an output response.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 2A:
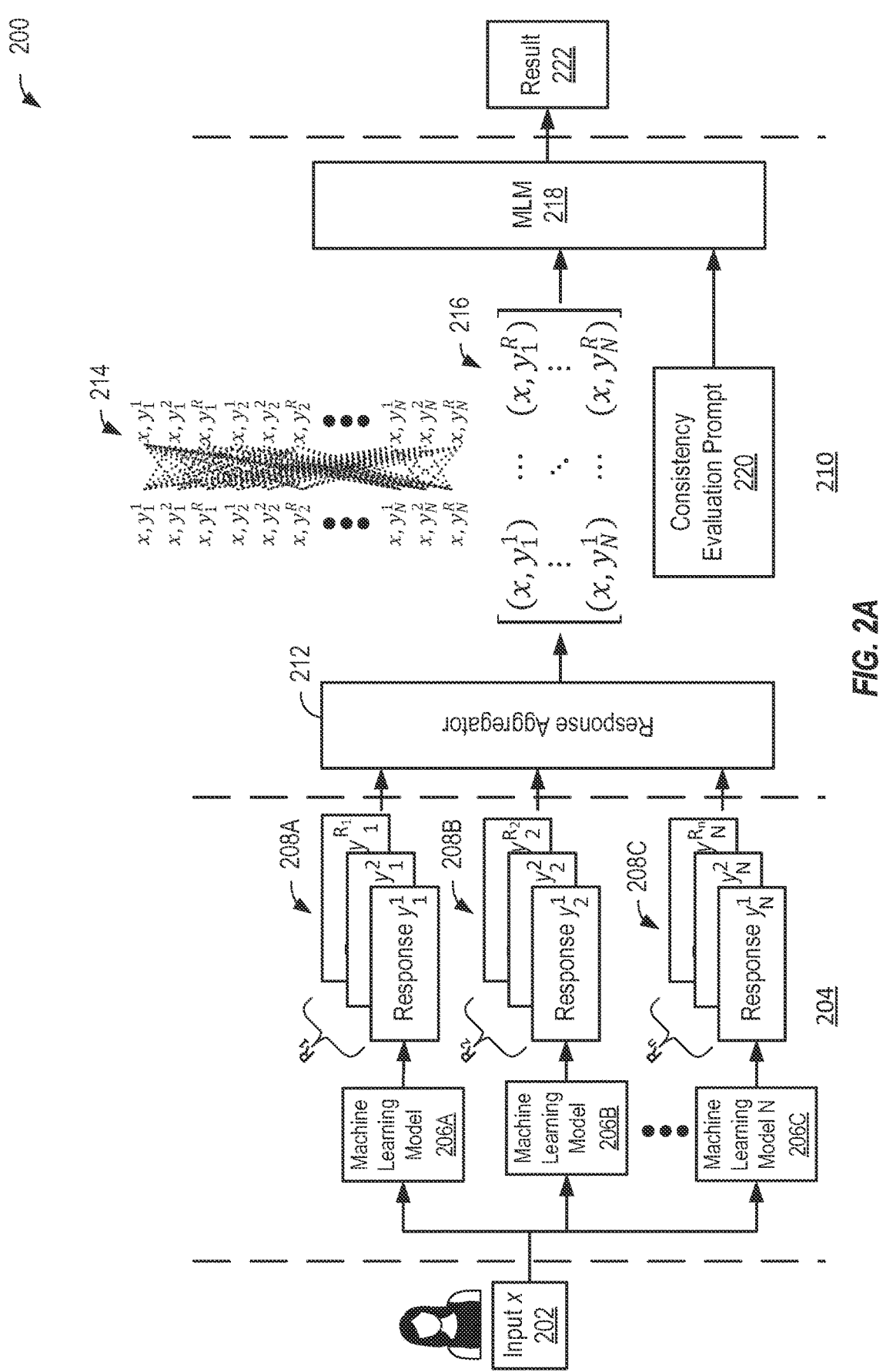

Aspects of the present disclosure provide apparatuses, methods, processing systems, and computer-readable mediums for leveraging multiple machine learning models to generate consistent output responses. In examples, the disclosed scalable consistency ensemble (SCE) framework evaluates and integrates responses from multiple machine learning models based on semantic consistency evaluations.

In certain aspects, the SCE system receives an input, such as a question or statement, and generates multiple intermediate responses using a plurality of machine learning models. A consistency checking process assesses the semantic consistency between these intermediate responses using an efficient prompt-based approach. A response selection mechanism then selects a subset of the most consistent responses according to consistency metrics. To generate an output response, the subset of the most consistent responses is fused into an improved final output response.

In certain aspects, the SCE system includes one or more machine learning models, including but not limited to, neural networks, decision trees, generative pretrained transformers (e.g., BERT), large language models (LLMs, e.g., GPTs), etc. The SCE system utilizes an efficient consistency checking process that allows for semantic equivalence evaluations between multiple intermediate responses in constant time complexity (e.g., an operation that takes the same amount of time to complete, regardless of the size of the input), rather than the quadratic time complexity that would be required for exhaustive pairwise comparisons between the intermediate responses. More specifically, semantic equivalence evaluations can be performed using a prompt-based technique to evaluate all intermediate responses in a single inference pass through a machine learning model, rather than prompting the machine learning model separately for each intermediate response. This reduces the overall time and number of computations when compared to a naive pairwise approach.

For example, if there were 100 intermediate responses that were to be evaluated, the naive pairwise approach would require 100*99/2=4,950 separate prompts to the language model. In contrast, by bundling all 100 intermediate responses into a single prompt, the consistency of the intermediate responses can be evaluated in a single pass, substantially reducing the amount of time and computations required. The ability to perform semantic equivalence evaluations allows the overall SCE system to scale more effectively as the number of response candidates grows. Additionally, reducing the number of inferences minimizes computational expenses for usage-based API services.

Further, the SCE system need not depend on any individual machine learning model when generating the resultant output. Instead, the SCE system can choose the most consistent intermediate responses for each specific input among multiple machine learning models. Accordingly, diverse strengths of different machine learning models can be utilized, rather than being restricted to a single predefined model. Specifically, by accessing an ensemble of models, for example, through API calls, the SCE system can utilize varied models that may be available as blackbox services. Ensembling responses from multiple machine learning models, via one or more APIs for example, increases performance and diversity when compared to single model-based responses.

Techniques disclosed for scalable consistency evaluations and fusing consistent responses provide a technical solution to the problem of inconsistency and contradictions in machine learning model outputs. In certain aspects, utilizing a prompt-based consistency checking methodology enables efficient assessments of semantic equivalence with constant time complexity, as opposed to quadratic time complexity, resulting in improved computational efficiency. Additionally, the selective fusion of consistent responses technically optimizes model strengths while mitigating individual model weaknesses, overcoming traditional approaches that rely on predefined models.

Example System for Leveraging Multiple Machine Learning Models to Generate Consistent Output Responses FIG. 1 depicts a system 100 that facilitates response generation by leveraging collective capabilities of machine learning models, such as but not limited to large language models (LLMs). Example LLMs include, but are not limited to GPT-3.5®, GPT-4®, BERT®, Claude®, Llama, and PaLM 2®. System 100 includes an input interface (102) configured to receive a user prompt (104). User prompt 104 can be any type of input. Non-limiting examples of user prompt 104 include, but are not limited to text, images, audio, video, etc. In examples, user prompt 104 solicits a response from one or more machine learning models. An example user prompt 104 is illustrated in FIG. 1, where the user prompt 104 is a question asking about current trends and future projections for the renewable energy sector.

Upon receiving user prompt 104, for example by a user invoking the submit element 106, system 100 utilizes a scalable consistency ensemble (SCE) system 108 to process the user prompt 104 and generate an output. The SCE system 108 may include multiple machine learning models, where each machine learning model of the multiple machine learning models generates one or more responses based on the user prompt 104. The responses generated from each machine learning model are evaluated for consistency and then used to synthesize a response, or resultant output, to the user prompt 104. The resultant output from the SCE system 108 is then presented to a user through an output interface (110), which includes the output 112.

Figure 2B:
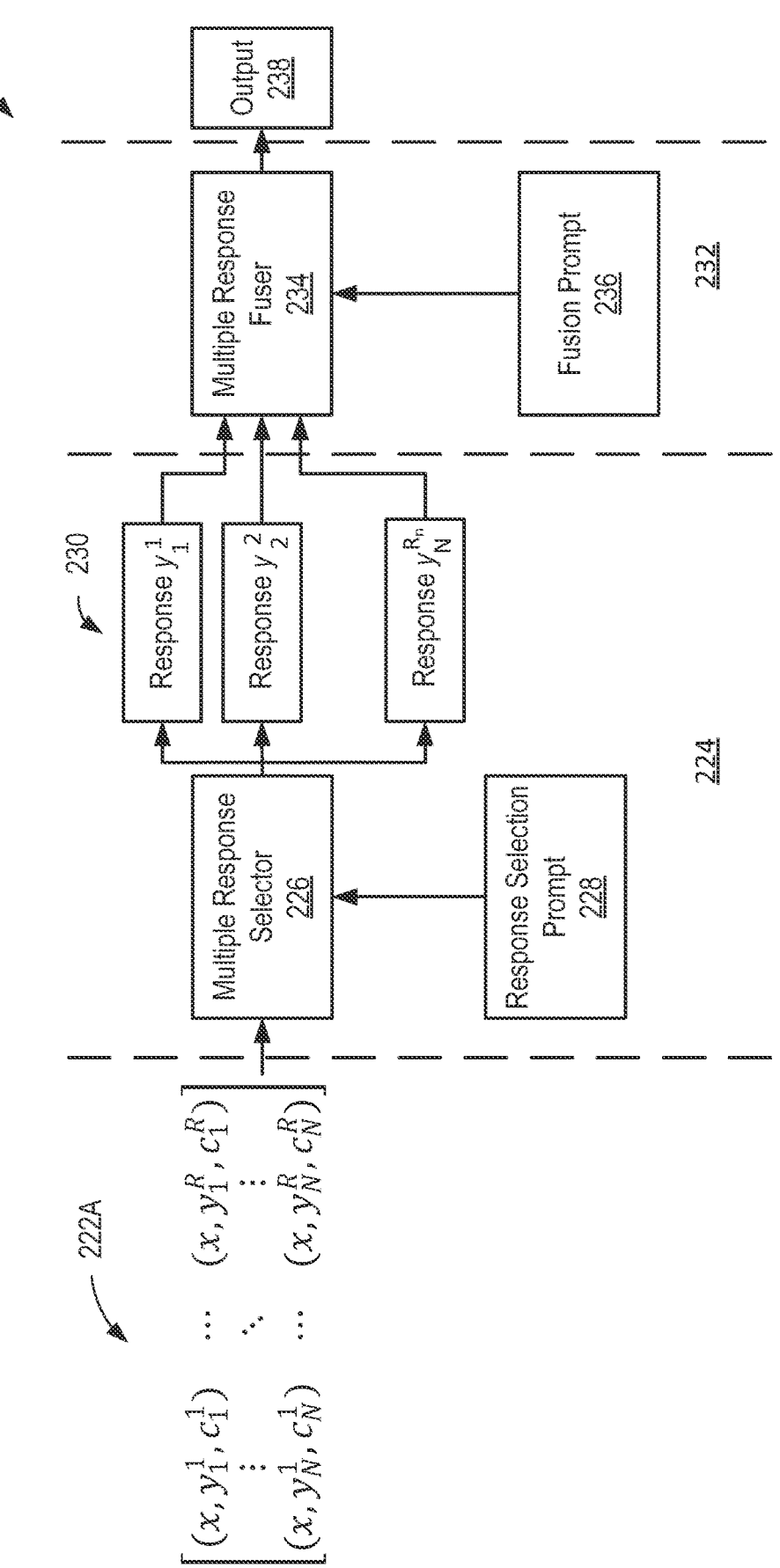

FIGS. 2A-2B depict additional details of the SCE system 200. The SCE system 200 may be the same as or similar to the SCE system 108 of FIG. 1. As depicted in FIGS. 2A and 2B, the SCE system 200 can include a response generation portion 204, a consistency checking portion 210, a response selection portion 224, and a response fusion portion 232.

As depicted in FIG. 2A, a user may provide user input 202, as a query or otherwise, to the response generation portion 204 of the SCE system 200. The user input 202 can be the same as or similar to the user prompt 104 of FIG. 1. In the response generation portion 204 of the SCE system 108, the user input 202 can be processed simultaneously by multiple machine learning models, denoted as 206A to 206C, where each machine learning model (e.g., 206A-206C) can generate intermediate responses 208A-208C. Although three machine learning models (e.g., 208A-208C) are depicted in FIG. 2A, the actual number of machine learning models employed could be fewer, more, or could vary depending on one or more factors (e.g., paid subscription, model-type, etc.)

In examples, the machine learning models 206A-206C perform stochastic sampling. Stochastic sampling refers to a process that can be influenced by a parameter like "temperature" that controls the randomness of the response generation by the machine learning model. In examples, a higher temperature leads to a greater diversity in responses, and a lower temperature results in more conservative and likely responses. In certain aspects, the machine learning model 206A may generate $R_1$ outputs based on the user input x 202, where $R_1$ is an integer number and corresponds to a number of outputs provided by the machine learning model 206A. Intermediate responses 208A could represent a set of intermediate responses, where each successive intermediate response (e.g., $y^1$, $y^2$, $y^{R_1}$) corresponds to an incremental increase or decrease in a temperature setting. This approach allows each machine learning model 206 to explore responses (e.g., 208) ranging from the most probable to more creative or less likely, depending on the temperature-driven variability in the sampling process.

In examples, $R_1$ may be equal to three, and each intermediate response (e.g., Response $y_1^1$, Response $y_1^2$, . . . Response $y_1^{R_1}$) may be generated by the machine learning model 206A using a different "temperature." In some instances, each intermediate response (e.g., Response $y_1^1$, Response $y_1^2$, . . . Response $y_1^{R_1}$) may be generated by the machine learning model 206A using a same "temperature"; however, each intermediate response (e.g., Response $y_1^1$, Response $y_1^2$, . . . Response $y_1^{R_1}$) may be different due in part to other machine learning model parameters, such as random initialization, parallelization, numerical precision, and data variability.

As another example, $R_2$ may be equal to three, and each intermediate response (e.g., Response $y_2^1$, Response $y_2^2$, . . . Response $y_2^{R_2}$) may be generated by the machine learning model 206B using a different "temperature". In some instances, each intermediate response (e.g., Response $y_2^1$, Response $y_2^2$, . . . Response $y_2^{R_2}$) may be generated by the machine learning model 206B using a same "temperature"; however, each intermediate response (e.g., Response $y_2^1$, Response $y_2^2$, . . . Response $y_2^{R_2}$) may be different due in part to other machine learning model parameters, such as random initialization, parallelization, numerical precision, and data variability. In some instances, $R_1$ is the same as $R_2$. In some instances, $R_1$ is different from $R_2$.

As another example, $R_n$ may be equal to three, and each intermediate response (e.g., Response $y_N^1$, Response $y_N^2$, . . . Response $y_N^{R_n}$) may be generated by the machine learning model N 206C using a different "temperature". In some instances, each intermediate response (e.g., Response $y_N^1$, Response $y_N^2$, . . . Response $y_N^{R_n}$) may be generated by the machine learning model N 206C using a same temperature; however, each intermediate response (e.g., Response $y_N^1$, Response $y_N^2$, . . . Response $y_N^{R_N}$) may be different due in part to other machine learning model parameters, such as random initialization, parallelization, numerical precision, and data variability. In some instances, $R_1$ is the same as $R_2$. In some instances, $R_1$ is different from $R_2$. In some instances, $R_n$ is the same as $R_1$ and/or $R_2$. In some instances, $R_n$ is different from $R_1$ and/or $R_2$.

The consistency checking portion 210 of the SCE system 200 evaluates the semantic consistency between intermediate responses 208A-208C. Semantic consistency between responses refers to the degree to which the meanings or information conveyed by the responses align or match, even if the wording or phrasing differs. In examples, one or more of the intermediate responses 208A-208C are provided to the consistency checking portion 210 of the SCE system 200 to determine a semantic consistency between intermediate responses 208A-208C. In some examples, the intermediate responses 208A-208C can include question-answer response pairs x, y, where x is equivalent to the user input x 202 and y is equivalent to an intermediate response provided by a machine learning model 206, such as Response $y_N^2$. In previous systems, to evaluate semantic consistency between responses, the responses were compared one by one, separately or independently for each response. That is, instead of comparing all responses together as a group or collectively, each response was examined and evaluated in an individual pairwise fashion. Comparing responses individually generally results in a significant computational burden. For instance, comparing each intermediate response pair (e.g., x, y) in a set of intermediate response pairs to every other intermediate response pair (e.g., x, y) within the same set of intermediate response pairs would involve a computational complexity that scales quadratically, denoted by Big O notation of $O(n^2)$, where "n" is the number of intermediate response pairs. Thus, comparing intermediate response pairs individually requires extensive time and resources as each element is compared with every other element.

The SCE system 200 improves the time complexity for performing semantic consistency evaluation between intermediate responses 208A-208C by aggregating the intermediate responses (e.g., 208A-208C) into a matrix or list format. For example, the intermediate responses 208A-208C are processed by the response aggregator 212 to obtain a matrix 216 that includes the intermediate response pairs 214 generated by at the response generation portion 204. The aggregation of the intermediate responses 208 allows for a single prompt that includes the intermediate responses 208 to be fed to the machine learning model 218 together with a consistency evaluation prompt 220, significantly reducing the number of operations needed to perform a semantic consistency evaluation process. That is, instead of individual pairwise comparisons, the intermediate responses 208 can be evaluated in a single pass according to a consistency evaluation prompt 220. By performing the evaluation in a single pass or single inference operation, the computational complexity is reduced and in Big O notation, can be represented as linear $O(n)$ or $O(m*n)$, where "n" represents the number of responses or inputs that need to be evaluated, "m" represents a fixed number of prompts or queries that are used for the evaluation, and $O(n)$ is less than $O(n^2)$. FIG. 2C depicts an example consistency evaluation prompt, which may be the same as or similar to the consistency evaluation prompt 220.

A consistency evaluation prompt 220, such as the consistency evaluation prompt depicted in FIG. 2C, instructs the machine learning model 218 to check if one intermediate response pair is semantically equivalent to another intermediate response pair. The machine learning model 218 returns the number of semantically equivalent response pairs for each pair. Semantic equivalence, also called semantic similarity, can be determined through binary decisions, similarity scores, or qualitative assessments, to name a few example techniques. For example, a binary decision labels each response pair as "similar" or "not similar", indicating whether two responses have essentially the same meaning. A similarity score may be a quantitative measure that measures how closely the intermediate response pairs match in meaning, with scores on a scale (e.g., 0 to 1) where higher scores denote greater similarity or equivalence. Additionally, the model could provide a qualitative evaluation of similarity, such as a textual assessment judging how equivalent two responses are.

As a non-limiting example, machine learning model 218 may receive the consistency evaluation prompt 220 and determine semantic equivalency, or similarity, for intermediate response pairs $(x, y_1^1)$, $(x, y_1^2)$, $(x, y_2^1)$, and $(x, y_2^2)$, where $y_1^1$ corresponds to Response $y_1^1$, $y_1^2$ corresponds to Response $y_1^2$, $y_2^1$ corresponds to Response $y_2^1$, and $y_2^2$ corresponds to Response $y_2^2$. In some examples, semantic equivalence can be determined between two intermediate response pairs using vector similarity. For example, the machine learning model 218 can encode intermediate response pairs into respective intermediate response pair vectors. The cosine similarity between two intermediate response pair vectors can indicate semantic equivalence. Intermediate response pairs with high vector similarity are considered to be semantically equivalent based on the common input. In certain instances, decisions regarding semantic equivalence can be made by applying a threshold to the cosine similarity score. For example, if the cosine similarity between two intermediate response pair vectors exceeds a predefined threshold, it indicates that the two intermediate response pairs are equivalent.

As one non-limiting example, the intermediate response pair $(x, y_1^1)$ is determined to be semantically equivalent to intermediate response pair $(x, y_1^2)$, but not intermediate response pair $(x, y_2^1)$ or intermediate response pair $(x, y_2^2)$. The intermediate response pair $(x, y_1^2)$ is determined to be semantically equivalent to intermediate response pair $(x, y_1^1)$ and intermediate response pair $(x, y_1^2)$, but not intermediate response pair $(x, y_2^2)$. Intermediate response pair $(x, y_2^1)$ is determined to be semantically equivalent to intermediate response pair $(x, y_2^2)$ and intermediate response pair $(x, y_2^1)$, but not intermediate response pair $(x, y_1^1)$. Intermediate response pair $(x, y_2^2)$ is determined to be semantically equivalent to none of the other intermediate response pairs.

In accordance with the consistency evaluation prompt 220, the machine learning model 218 then tallies the semantic equivalences as follows: for the intermediate response pair $(x, y_1^1)$, there is one occurrence; for the intermediate response pair $(x, y_2^1)$, there are two occurrences; for the intermediate response pair $(x, y_1^2)$, there are two occurrences; and for the intermediate response pair $(x, y_1^2)$, there are zero occurrences. These tallies, or number of occurrences, indicate the number of semantically similar intermediate response pairs and may be provided as the result 222. That is, the tallies represent a semantic consistency metric, where the semantic consistency metric indicates a number of other intermediate response pairs that are determined to be semantically equivalent to a respective intermediate response pair. In examples, result 222 may indicate the semantic consistency metric as depicted by result 222A in FIG. 2B.

FIG. 2B depicts additional details of a response selection portion 224 and a response fusion portion 232 of the SCE system 200. In examples, the multiple response selector 226 receives the result 222A and selects a subset of the intermediate response pairs based on certain criteria, such as relevance, diversity, or other strategic considerations. In some examples, the multiple response selector 226 ranks the intermediate response pairs by their respective semantic consistency metrics and then picks the top N intermediate response pairs from the ranked list. For example, the top 3 (e.g., N=3) intermediate response pairs out of $(x, y_1^1)$, $(x, y_1^2)$, $(x, y_2^1)$, $(x, y_2^2)$, would be $(x, y_2^1)$ having two occurrences, $(x, y_1^2)$ having two occurrences, and $(x, y_1^1)$ having one occurrence. Alternatively, or in addition, the multiple response selector 226 may select intermediate response pairs having semantic consistency metrics exceeding a threshold number of equivalent pairs. For example, intermediate response pairs having a semantic consistency metric that is greater than two would include $(x, y_2^1)$ having two occurrences and $(x, y_1^2)$ having two occurrences. Accordingly, the result of the multiple response selector 226 may be a subset 230 of intermediate response pairs.

In some examples, the multiple response selector 226 may be an LLM configured to select one or more intermediate response pairs based on the response selection prompt 228. For instance, the response selection prompt 228 could cause the multiple response selector 226 to select intermediate response pairs based on their semantic equivalence metrics and/or semantic equivalence scores.

The subset 230 of intermediate response pairs can be provided to the response fusion portion 232 of the SCE system 200. In examples, the response fusion portion 232 includes a multiple response fuser 234 and fusion prompt 236. The multiple response fuser 234 can merge, or fuse, multiple top-ranked intermediate response pairs (e.g., subset 230) to generate an improved output 238 as the final response, where the output 238 is based on user input 202. In examples, the multiple response fuser 234 may be a machine learning model and more specifically, an LLM. In some examples, the machine learning model of the multiple response fuser 234 may be the same as or similar to machine learning model 218 and/or machine learning models 206A, 206B, and/or 206C.

The fusion prompt 236 provides instructions to the multiple response fuser 234 on how to effectively merge the selected intermediate response pairs (e.g., subset 230) into a final output 238. Some examples of what the fusion prompt 236 may specify include, but are not limited to, a summarization approach, constraints, evaluation criteria, relative weighting of intermediate response pairs, and any diversity requirements. For example, the fusion prompt 236 may specify an abstractive or extractive summarization method to fuse the subset of intermediate response pairs. The prompt could direct the response fuser 234 to identify common themes and generate a new summary versus extracting salient excerpts. In some examples, fusion prompt 236 may define constraints about length, formatting, style to meet for the output 238, and thereby allowing customization. As another example, fusion prompt 236 can provide optimization criteria like coherence, relevance, and accuracy to target specific qualities. It can also provide guidance on weighting higher vs. lower-ranking responses. Specifying diversity in phrasing or content can help avoid repetition and redundancy. FIG. 2D depicts an example fusion prompt, which may be the same as or similar to the fusion prompt 236. The fusion prompt 236, such as the fusion prompt of FIG. 2D, instructs the response fuser 234 to generate an output that involves summarizing multiple semantically equivalent answers into a single, improved, and more comprehensive answer or output.

Example Data Structure for Leveraging Multiple Machine Learning Models to Generate Consistent Output Responses FIG. 3 provides an overview of an example data structure 300 for leveraging multiple machine learning models to generate consistent output responses in accordance with examples of the present disclosure. The data structure 300 includes a prompt 302, response 304, consistency metric 306, and fused output 310. In examples, the data structure 300 may include another field 308 that includes additional information about one or more of the prompt 302, response 304, consistency metric 306, and/or fused output 310. For example, the other 308 may include one or more of the consistency evaluation prompt 220 and/or the fusion prompt 236, metadata, usage statistics, authorship information, or other relevant data that may be useful for generating a response.

The prompt 302 may point to or otherwise contain an input prompt, which may be the same as or similar to user prompt 104 and/or user input x 202. The response 304 may include on or more of the intermediate responses and/or intermediate response pairs as previously described with respect to FIGS. 2A-2B. The consistency metric 306 can include or otherwise point to a semantic consistency metric and/or a semantic consistency score as previously described with respect to FIGS. 2A-2B. In examples, the fused output 310 may point to or otherwise contain a fused output which may be the same as or similar to output 112 and/or output 238 as described with respect to FIG. 1 and FIG. 2B.

Example Methods for Leveraging Multiple Machine Learning Models to Generate Consistent Output Responses FIG. 4 depicts an example method for generating an output response. In one aspect, method 400 can be implemented by the system 100 of FIG. 1, SCE system 200 of FIGS. 2A-2B, and/or system 600 of FIG. 6.

Method 400 starts at block 402 with receiving an input.

The method 400 continues to block 404 with generating a plurality of intermediate responses to the input using a plurality of machine learning models. In some embodiments, each machine learning model of the plurality of machine learning models generates at least one intermediate response based on the input.

The method 400 continues to block 406 with generating a semantic consistency metric for each respective intermediate response of the plurality of intermediate responses by performing a comparison between the respective intermediate response and other intermediate responses of the plurality of intermediate responses.

The method 400 continues to block 408 with selecting a subset of the plurality of intermediate responses based on the semantic consistency metric of each respective intermediate response of the plurality of intermediate responses.

The method 400 continues to block 410 with generating an output response based on the subset of the plurality of intermediate responses.

In some embodiments of method 400, generating the semantic consistency metric by performing the comparison between the respective intermediate response and the other intermediate responses of the plurality of intermediate responses comprises: determining whether the respective intermediate response is semantically equivalent to each intermediate response of the other intermediate responses; and tallying a number of intermediate responses of the plurality of intermediate responses that are determined to be semantically equivalent to the respective intermediate response.

In some embodiments of method 400, determining whether the respective intermediate response is semantically equivalent to each intermediate response of the other intermediate responses comprises: determining a semantic equivalence score between the respective intermediate response and each intermediate response of the other intermediate responses, wherein the semantic equivalence score indicates a degree of semantic equivalence between two response; comparing the semantic equivalence score to a threshold semantic equivalence score; and determining that the respective intermediate response and the other intermediate response are semantically equivalent when the semantic equivalence score exceeds the threshold semantic equivalence score.

In some embodiments of method 400, generating the semantic consistency metric comprises: aggregating the plurality of intermediate responses into a response prompt; providing the response prompt and an evaluation prompt template to a consistency evaluation machine learning model; and receiving the semantic consistency metric for each intermediate response of the plurality of intermediate responses from the consistency evaluation machine learning model.

In some embodiments of method 400, the semantic consistency metric for each intermediate response indicates a number of other intermediate responses that are determined to be semantically equivalent to the respective intermediate response.

In some embodiments of method 400, selecting the subset of the plurality of intermediate responses based on the semantic consistency metric of each respective intermediate response of the plurality of intermediate responses comprises: ranking the plurality of intermediate responses based on the respective semantic consistency metrics to identify intermediate responses having a highest number of semantic equivalent intermediate responses in the plurality of intermediate responses; and selecting the top N ranked intermediate responses as the subset of the plurality of intermediate responses, wherein N is an integer.

In some embodiments of method 400, selecting the subset of the plurality of intermediate responses based on the semantic consistency metric of each respective intermediate response of the plurality of intermediate responses comprises: determining a subset of intermediate responses having respective semantic consistency metrics that exceed a threshold number of equivalent responses; and selecting the subset of intermediate responses as those intermediate responses exceeding the threshold number of equivalent responses.

In some embodiments of method 400, generating the output response based on the subset of the plurality of intermediate responses comprises: providing an intermediate response fusion prompt and the subset of the plurality of intermediate responses to a fusion machine learning model; and receiving a response from the fusion machine learning model.

In some embodiments of method 400, each respective intermediate response of the plurality of intermediate responses includes the input and a generated response to the input.

In some embodiments of method 400, generating the plurality of intermediate responses to the input using the plurality of machine learning models comprises obtaining a plurality of stochastic response samples from each machine learning model of the plurality of machine learning models by varying a temperature parameter of the respective machine learning model of the plurality of machine learning models.

In some embodiments of method 400, each machine learning model of the plurality of machine learning models is a large language model.

Note that FIG. 4 is just one example of a method, and other methods including fewer, additional, or alternative steps are possible consistent with this disclosure.

FIG. 5 depicts an example method 500 for evaluating consistency across machine learning model response outputs and synthesizing an output response. In one aspect, method 500 can be implemented by the system 100 of FIG. 1, SCE system 200 of FIGS. 2A-2B, and/or system 600 of FIG. 6.

Method 500 starts at block 502 with receiving a plurality of response pairs, each response pair of the plurality of response pairs including an input and a generated output.

The method 500 continues to block 504 with aggregating the plurality of response pairs into a response prompt.

The method 500 continues to block 506 with providing the response prompt and an evaluation prompt template to a semantic evaluation consistency model.

The method 500 continues to block 508 with receiving a semantic consistency metric for each response pair of the plurality of response pairs from the semantic evaluation consistency model.

The method 500 continues to block 510 with selecting a subset of the plurality of response pairs based on the semantic consistency metric for each respective response pair of the plurality of response pairs.

The method 500 continues to block 512 with providing a synthesizing prompt and the selected subset of the plurality of response pairs to a synthesizing model.

The method 500 continues to block 514 with receiving a synthesized output response, based on the synthesizing prompt and the subset of the plurality of response pairs, from the synthesizing model.

The method 500 continues to block 516 with providing the synthesized output response as the output response.

In some embodiments of method 500, the semantic evaluation consistency model and the synthesizing model are the same machine learning model.

In some embodiments of method 500, receiving the plurality of response pairs comprises receiving at least one response pair from a plurality of different machine learning models, each response pair of the at least one response pair corresponding to a same input.

In some embodiments of method 500, selecting the subset of the plurality of response pairs based on the semantic consistency metric for each respective response pair of the plurality of response pairs, comprises: ranking the plurality of response pairs based on the semantic consistency metric to identify one or more response pairs having a highest number of semantic equivalent response pairs in the plurality of response pairs; and selecting the top N ranked response pairs as the subset of the plurality of response pairs, wherein N is an integer.

In some embodiments of method 500, the semantic consistency metric for each response pair is a tally of a number of other response pairs of the plurality of response pairs that are determined to be semantically equivalent to the respective response pair.

Note that FIG. 5 is just one example of a method, and other methods including fewer, additional, or alternative steps are possible consistent with this disclosure.

Figure 6:
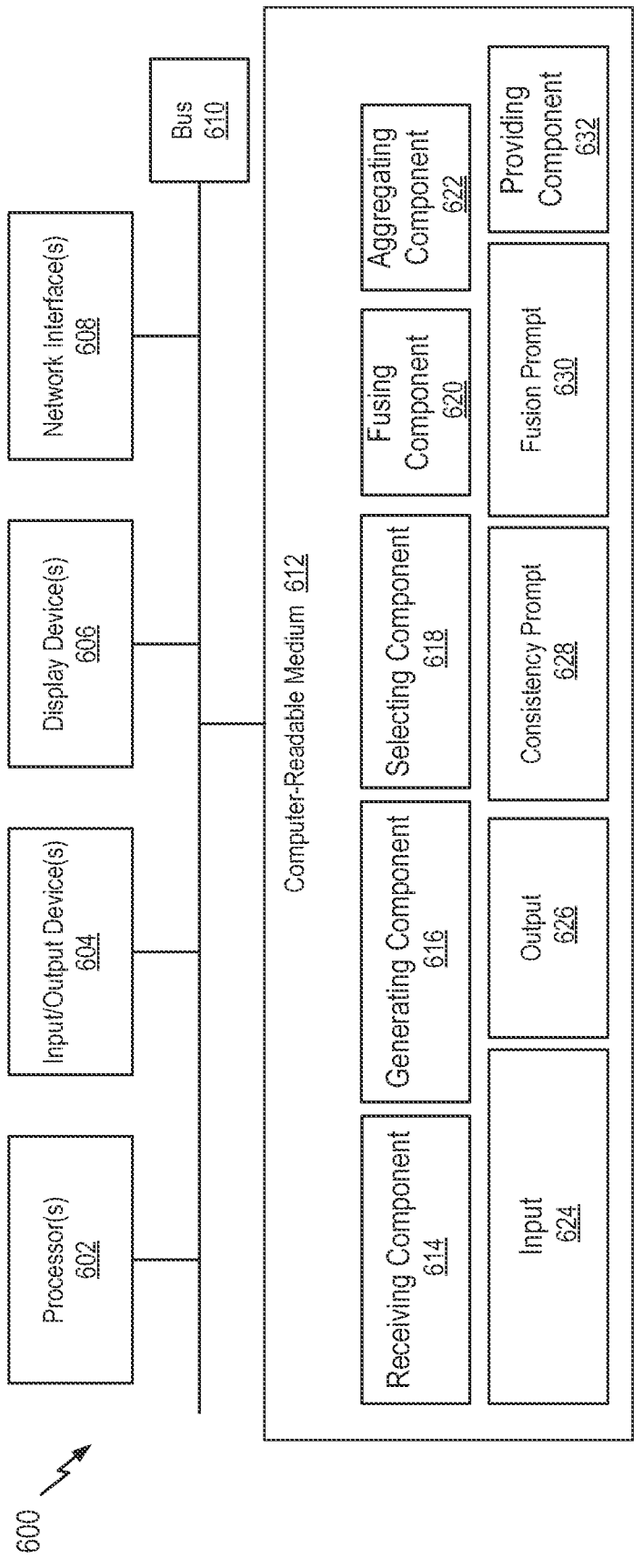
FIG. 6 depicts an example processing system with which aspects of the present disclosure can be performed.

Example Processing System for Leveraging Multiple Machine Learning Models to Generate Consistent Output Responses FIG. 6 depicts an example processing system 600 configured to perform various aspects described herein, including, for example, method 400 as described above with respect to FIG. 4 and method 500 as described above with respect to FIG. 5.

Processing system 600 is generally an example of an electronic device configured to execute computer-executable instructions, such as those derived from compiled computer code, including without limitation personal computers, tablet computers, servers, smart phones, smart devices, wearable devices, augmented and/or virtual reality devices, and others.

In the depicted example, processing system 600 includes one or more processors 602, one or more input/output devices 604, one or more display devices 606, one or more network interfaces 608 through which processing system 600 is connected to one or more networks (e.g., a local network, an intranet, the Internet, or any other group of processing systems communicatively connected to each other), and computer-readable medium 612. In the depicted example, the aforementioned components are coupled by a bus 610, which may generally be configured for data exchange amongst the components. Bus 610 may be representative of multiple buses, while only one is depicted for simplicity.

Processor(s) 602 are generally configured to retrieve and execute instructions stored in one or more memories, including local memories like computer-readable medium 612, as well as remote memories and data stores. Similarly, processor(s) 602 are configured to store application data residing in local memories like the computer-readable medium 612, as well as remote memories and data stores. More generally, bus 610 is configured to transmit programming instructions and application data among the processor(s) 602, display device(s) 606, network interface(s) 608, and/or computer-readable medium 612. In certain embodiments, processor(s) 602 are representative of a one or more central processing units (CPUs), graphics processing unit (GPUs), tensor processing unit (TPUs), accelerators, and other processing devices.

Input/output device(s) 604 may include any device, mechanism, system, interactive display, and/or various other hardware and software components for communicating information between processing system 600 and a user of processing system 600. For example, input/output device(s) 604 may include input hardware, such as a keyboard, touch screen, button, microphone, speaker, and/or other device for receiving inputs from the user and sending outputs to the user.

Display device(s) 606 may generally include any sort of device configured to display data, information, graphics, user interface elements, and the like to a user. For example, display device(s) 606 may include internal and external displays such as an internal display of a tablet computer or an external display for a server computer or a projector. Display device(s) 606 may further include displays for devices, such as augmented, virtual, and/or extended reality devices. In various embodiments, display device(s) 606 may be configured to display a graphical user interface.

Network interface(s) 608 provides processing system 600 with access to external networks and thereby to external processing systems. Network interface(s) 608 can generally be any hardware and/or software capable of transmitting and/or receiving data via a wired or wireless network connection. Accordingly, network interface(s) 608 can include a communication transceiver for sending and/or receiving any wired and/or wireless communication.

Computer-readable medium 612 may be a volatile memory, such as a random-access memory (RAM), or a nonvolatile memory, such as nonvolatile random-access memory (NVRAM), or the like. In this example, computer-readable medium 612 includes a receiving component 614, generating component 616, selecting component 618, fusing component 620, aggregating component 622, input 624, output 626, consistency evaluation prompt 628, and fusion prompt 630.

In certain embodiments, the receiving component 614 is configured to receive an input from a user or otherwise. In certain embodiments, the generating component 616 is configured to generate a plurality of intermediate responses to the input using a plurality of machine learning models, wherein each machine learning model of the plurality of machine learning models generates at least one intermediate response based on the input. In examples, the generating component 616 can perform one or more functions of the machine learning models 206 of FIG. 2A. In certain embodiments, the generating component 616 is configured to generate a semantic consistency metric for each respective intermediate response of the plurality of intermediate responses by performing a comparison between the respective intermediate response and other intermediate responses of the plurality of intermediate responses. In examples, the generating component 616 can perform one or more functions of machine learning model 218 of FIG. 2A. In certain embodiments, the selecting component 618 is configured to select a subset of the plurality of intermediate responses based on the semantic consistency metric of each respective intermediate response of the plurality of intermediate responses. In examples, the selecting component 618 can perform one or more functions of the multiple response selector 226 of FIG. 2A. In certain embodiments, the fusing component 620 is configured to generate an output response based on the subset of the plurality of intermediate responses. In examples, the fusing component 620 can perform one or more functions of the multiple response fuser 234 of FIG. 2B. In certain embodiments, the input 624 may be the same as or similar to the user prompt 104 of FIG. 1 and/or the user input 202 of FIG. 2A. In certain embodiments, the output 626 may be the same as or similar to the output 112 of FIG. 1 and/or the output 238 of FIG. 2B. In certain embodiments, the consistency evaluation prompt 628 may be the same as or similar to the consistency evaluation prompt 220 of FIG. 2A. In certain embodiments, the fusion prompt 630 may be the same as or similar to the fusion prompt 236 of FIG. 2B.

In certain embodiments, the receiving component 614 is configured to receive a plurality of response pairs, each response pair of the plurality of response pairs including an input and a generated output. In certain embodiments, the aggregating component 622 is configured to aggregate the plurality of response pairs into a response prompt. In examples, the aggregating component 622 can perform one or more functions of the machine learning models 206 of FIG. 2A. In certain embodiments, the providing component 632 is configured to provide the response prompt and an evaluation prompt template to a semantic evaluation consistency model. In certain embodiments, the receiving component 614 is configured to receive a semantic consistency metric for each response pair of the plurality of response pairs from the semantic evaluation consistency model. In certain embodiments, the selecting component 618 is configured to select a subset of the plurality of response pairs based on the semantic consistency metric for each respective response pair of the plurality of response pairs. In examples, the selecting component 618 can perform one or more functions of the multiple response selector 226 of FIG. 2A. In certain embodiments, the providing component 632 is configured to provide a synthesizing prompt and the selected subset of the plurality of response pairs to a synthesizing model. In certain embodiments, the receiving component 614 is configured to receive a synthesized output response, based on the synthesizing prompt and the subset of the plurality of response pairs, from the synthesizing model. In certain embodiments, the providing component 632 is configured to provide the synthesized output response as the output response.

Note that FIG. 6 is just one example of a processing system consistent with aspects described herein, and other processing systems having additional, alternative, or fewer components are possible consistent with this disclosure.

Example Clauses

Implementation examples are described in the following numbered clauses:

Clause 1: A method for generating an output response, comprising: receiving an input; generating a plurality of intermediate responses to the input using a plurality of machine learning models, wherein each machine learning model of the plurality of machine learning models generates at least one intermediate response based on the input; generating a semantic consistency metric for each respective intermediate response of the plurality of intermediate responses by performing a comparison between the respective intermediate response and other intermediate responses of the plurality of intermediate responses; selecting a subset of the plurality of intermediate responses based on the semantic consistency metric of each respective intermediate response of the plurality of intermediate responses; and generating an output response based on the subset of the plurality of intermediate responses.

Clause 2: The method of Clause 1, wherein generating the semantic consistency metric by performing the comparison between the respective intermediate response and the other intermediate responses of the plurality of intermediate responses comprises: determining whether the respective intermediate response is semantically equivalent to each intermediate response of the other intermediate responses; and tallying a number of intermediate responses of the plurality of intermediate responses that are determined to be semantically equivalent to the respective intermediate response.

Clause 3: The method of Clause 2, wherein determining whether the respective intermediate response is semantically equivalent to each intermediate response of the other intermediate responses comprises: determining a semantic equivalence score between the respective intermediate response and each intermediate response of the other intermediate responses, wherein the semantic equivalence score indicates a degree of semantic equivalence between two response; comparing the semantic equivalence score to a threshold semantic equivalence score; and determining that the respective intermediate response and the other intermediate response are semantically equivalent when the semantic equivalence score exceeds the threshold semantic equivalence score.

Clause 4: The method of any one of Clauses 1-3, wherein generating the semantic consistency metric comprises: aggregating the plurality of intermediate responses into a response prompt; providing the response prompt and an evaluation prompt template to a consistency evaluation machine learning model; and receiving the semantic consistency metric for each intermediate response of the plurality of intermediate responses from the consistency evaluation machine learning model.

Clause 5: The method of Clause 4, wherein the semantic consistency metric for each intermediate response indicates a number of other intermediate responses that are determined to be semantically equivalent to the respective intermediate response.

Clause 6: The method of Clause 5, wherein selecting the subset of the plurality of intermediate responses based on the semantic consistency metric of each respective intermediate response of the plurality of intermediate responses comprises: ranking the plurality of intermediate responses based on the respective semantic consistency metrics to identify intermediate responses having a highest number of semantic equivalent intermediate responses in the plurality of intermediate responses; and selecting the top N ranked intermediate responses as the subset of the plurality of intermediate responses, wherein N is an integer.

Clause 7: The method of Clause 5, wherein selecting the subset of the plurality of intermediate responses based on the semantic consistency metric of each respective intermediate response of the plurality of intermediate responses comprises: determining a subset of intermediate responses having respective semantic consistency metrics that exceed a threshold number of equivalent responses; and selecting the subset of intermediate responses as those intermediate responses exceeding the threshold number of equivalent responses.

Clause 8: The method of any of Clauses 1-7, wherein generating the output response based on the subset of the plurality of intermediate responses comprises: providing an intermediate response fusion prompt and the subset of the plurality of intermediate responses to a fusion machine learning model; and receiving a response from the fusion machine learning model.

Clause 9: The method of any one of Clauses 1-8, wherein each respective intermediate response of the plurality of intermediate responses includes the input and a generated response to the input.

Clause 10: The method of any one of Clauses 1-9, wherein generating the plurality of intermediate responses to the input using the plurality of machine learning models comprises obtaining a plurality of stochastic response samples from each machine learning model of the plurality of machine learning models by varying a temperature parameter of the respective machine learning model of the plurality of machine learning models.

Clause 11: The method of any one of Clauses 1-10, wherein each machine learning model of the plurality of machine learning models is a large language model.

Clause 12: A method for evaluating consistency across machine learning model response outputs and synthesizing an output response, the method comprising: receiving a plurality of response pairs, each response pair of the plurality of response pairs including an input and a generated output; aggregating the plurality of response pairs into a response prompt; providing the response prompt and an evaluation prompt template to a semantic evaluation consistency model; receiving a semantic consistency metric for each response pair of the plurality of response pairs from the semantic evaluation consistency model; selecting a subset of the plurality of response pairs based on the semantic consistency metric for each respective response pair of the plurality of response pairs; providing a synthesizing prompt and the selected subset of the plurality of response pairs to a synthesizing model; receiving a synthesized output response, based on the synthesizing prompt and the subset of the plurality of response pairs, from the synthesizing model; and providing the synthesized output response as the output response.

Clause 13: The method of Clause 12, wherein the semantic evaluation consistency model and the synthesizing model are the same machine learning model.

Clause 14: The method of any one of Clauses 12-13, wherein receiving the plurality of response pairs comprises receiving at least one response pair from a plurality of different machine learning models, each response pair of the at least one response pair corresponding to a same input.

Clause 15: The method of any one of Clauses 12-14, wherein selecting the subset of the plurality of response pairs based on the semantic consistency metric for each respective response pair of the plurality of response pairs, comprises: ranking the plurality of response pairs based on the semantic consistency metric to identify one or more response pairs having a highest number of semantic equivalent response pairs in the plurality of response pairs; and selecting the top N ranked response pairs as the subset of the plurality of response pairs, wherein Nis an integer.

Clause 16: The method of any one of Clauses 12-15, wherein the semantic consistency metric for each response pair is a tally of a number of other response pairs of the plurality of response pairs that are determined to be semantically equivalent to the respective response pair.

Clause 17: A processing system, comprising: a memory comprising computer-executable instructions; and a processor configured to execute the computer-executable instructions and cause the processing system to perform a method in accordance with any one of Clauses 1-16.

Clause 18: A processing system, comprising means for performing a method in accordance with any one of Clauses 1-16.

Clause 19: A non-transitory computer-readable medium storing program code for causing a processing system to perform the steps of any one of Clauses 1-16.

Clause 20: A computer program product embodied on a computer-readable storage medium comprising code for performing a method in accordance with any one of Clauses 1-16.

ADDITIONAL CONSIDERATIONS

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented, or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database, or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for generating an output response, comprising:

receiving an input;

generating a plurality of intermediate responses to the input using a plurality of machine learning models, wherein each machine learning model of the plurality of machine learning models generates at least one intermediate response based on the input;

generating a semantic consistency metric for each respective intermediate response of the plurality of intermediate responses by performing a comparison between the respective intermediate response and other intermediate responses of the plurality of intermediate responses;

selecting a subset of the plurality of intermediate responses based on the semantic consistency metric of each respective intermediate response of the plurality of intermediate responses; and generating an output response based on the subset of the plurality of intermediate responses.

2. The method of claim 1, wherein generating the semantic consistency metric by performing the comparison between the respective intermediate response and the other intermediate responses of the plurality of intermediate responses comprises:

determining whether the respective intermediate response is semantically equivalent to each intermediate response of the other intermediate responses; and tallying a number of intermediate responses of the plurality of intermediate responses that are determined to be semantically equivalent to the respective intermediate response.

3. The method of claim 2, wherein determining whether the respective intermediate response is semantically equivalent to each intermediate response of the other intermediate responses comprises:

determining a semantic equivalence score between the respective intermediate response and each intermediate response of the other intermediate responses, wherein the semantic equivalence score indicates a degree of semantic equivalence between two responses;

comparing the semantic equivalence score between the respective intermediate response and each intermediate response of the other intermediate responses to a threshold semantic equivalence score; and determining that the respective intermediate response and one intermediate response of the other intermediate responses are semantically equivalent when the semantic equivalence score of the respective intermediate response and the one intermediate response exceeds the threshold semantic equivalence score.

4. The method of claim 1, wherein generating the semantic consistency metric by performing the comparison between the respective intermediate response and other intermediate responses of the plurality of intermediate responses, comprises:

aggregating the plurality of intermediate responses into a response prompt;

providing the response prompt and an evaluation prompt template to a consistency evaluation machine learning model; and receiving the semantic consistency metric for each respective intermediate response of the plurality of intermediate responses from the consistency evaluation machine learning model.

5. The method of claim 4, wherein the semantic consistency metric for each respective intermediate response indicates a number of other intermediate responses that are determined to be semantically equivalent to the respective intermediate response.

6. The method of claim 5, wherein selecting the subset of the plurality of intermediate responses based on the semantic consistency metric of each respective intermediate response of the plurality of intermediate responses comprises:

ranking the plurality of intermediate responses based on the semantic consistency metric of each respective intermediate response to identify intermediate responses having a highest number of semantic equivalent intermediate responses in the plurality of intermediate responses; and selecting the top N ranked intermediate responses as the subset of the plurality of intermediate responses, wherein Nis an integer.

7. The method of claim 5, wherein selecting the subset of the plurality of intermediate responses based on the semantic consistency metric of each respective intermediate response of the plurality of intermediate responses comprises:

determining a subset of intermediate responses having respective semantic consistency metrics that exceed a threshold number of equivalent responses; and selecting the subset of intermediate responses as those intermediate responses having respective semantic consistency metrics exceeding the threshold number of equivalent responses.

8. The method of claim 1, wherein generating the output response based on the subset of the plurality of intermediate responses comprises:

providing an intermediate response fusion prompt and the subset of the plurality of intermediate responses to a fusion machine learning model; and receiving a response from the fusion machine learning model.

9. The method of claim 1, wherein each respective intermediate response of the plurality of intermediate responses includes the input and a generated response to the input.

10. The method of claim 1, wherein generating the plurality of intermediate responses to the input using the plurality of machine learning models comprises obtaining a plurality of stochastic response samples from each machine learning model of the plurality of machine learning models by varying a temperature parameter of each respective machine learning model of the plurality of machine learning models.

11. The method of claim 1, wherein each machine learning model of the plurality of machine learning models is a large language model.

12. A processing system, comprising:

a memory comprising computer-executable instructions; and a processor configured to execute the computer-executable instructions and cause the processing system to:

receive an input;

generate a plurality of intermediate responses to the input using a plurality of machine learning models, wherein each machine learning model of the plurality of machine learning models is configured to generate at least one intermediate response based on the input;

generate a semantic consistency metric for each respective intermediate response of the plurality of intermediate responses by performing a comparison between the respective intermediate response and other intermediate responses of the plurality of intermediate responses;

select a subset of the plurality of intermediate responses based on the semantic consistency metric of each respective intermediate response of the plurality of intermediate responses; and generate an output response based on the subset of the plurality of intermediate responses.

13. The processing system of claim 12, wherein to generate the semantic consistency metric by performing the comparison between the respective intermediate response and other intermediate responses of the plurality of intermediate responses, the processor is configured to cause the processing system to:

aggregate the plurality of intermediate responses into a response prompt;

provide the response prompt and an evaluation prompt template to a consistency evaluation machine learning model; and receive the semantic consistency metric for each respective intermediate response of the plurality of intermediate responses from the consistency evaluation machine learning model, wherein the semantic consistency metric for each respective intermediate response indicates a number of other intermediate responses that are determined to be semantically equivalent to the respective intermediate response.

14. The processing system of claim 13, wherein to select the subset of the plurality of intermediate responses based on the semantic consistency metric of each respective intermediate response of the plurality of intermediate responses, the processor is configured to cause the processing system to:

rank the plurality of intermediate responses based on the semantic consistency metrics of each respective intermediate response to identify intermediate responses having a highest number of semantic equivalent intermediate responses in the plurality of intermediate responses; and select the top N ranked intermediate responses as the subset of the plurality of intermediate responses, wherein Nis an integer.

15. The processing system of claim 12, wherein to generate the output response based on the subset of the plurality of intermediate responses, the processor is configured to cause the processing system to:

provide an intermediate response fusion prompt and the subset of the plurality of intermediate responses to a fusion machine learning model; and receive a response from the fusion machine learning model.

16. A method for evaluating consistency across machine learning model response outputs and synthesizing an output response, the method comprising:

receiving a plurality of response pairs, each response pair of the plurality of response pairs including an input and a generated output;

aggregating the plurality of response pairs into a response prompt;

providing the response prompt and an evaluation prompt template to a semantic evaluation consistency model;

receiving a semantic consistency metric for each respective response pair of the plurality of response pairs from the semantic evaluation consistency model;

selecting a subset of the plurality of response pairs based on the semantic consistency metric for each respective response pair of the plurality of response pairs;

providing a synthesizing prompt and the selected subset of the plurality of response pairs to a synthesizing model;

receiving a synthesized output response, based on the synthesizing prompt and the subset of the plurality of response pairs, from the synthesizing model; and providing the synthesized output response as the output response.

17. The method of claim 16, wherein the semantic evaluation consistency model and the synthesizing model are the same machine learning model.

18. The method of claim 16, wherein receiving the plurality of response pairs comprises receiving at least one response pair from a plurality of different machine learning models, each response pair of the at least one response pair corresponding to a same input.

19. The method of claim 16, wherein selecting the subset of the plurality of response pairs based on the semantic consistency metric for each respective response pair of the plurality of response pairs, comprises:

ranking the plurality of response pairs based on the semantic consistency metric for each respective response pair of the plurality of response pairs to identify one or more response pairs having a highest number of semantic equivalent response pairs in the plurality of response pairs; and selecting the top N ranked response pairs as the subset of the plurality of response pairs, wherein Nis an integer.

20. The method of claim 16, wherein the semantic consistency metric for each respective response pair of the plurality of response pairs is a tally of a number of other response pairs of the plurality of response pairs that are determined to be semantically equivalent to the respective response pair.

* * * * *